May 18, 1926.

J. H. POPE

NAILING DIE

Filed Jan. 12, 1923  2 Sheets-Sheet 1

1,584,804

INVENTOR
Joseph H. Pope
By his Attorney
Nelson W. Howard

Patented May 18, 1926.

1,584,804

UNITED STATES PATENT OFFICE.

JOSEPH H. POPE, OF SOUTH HAMILTON, MASSACHUSETTS, ASSIGNOR TO UNITED SHOE MACHINERY CORPORATION, OF PATERSON, NEW JERSEY, A CORPORATION OF NEW JERSEY.

NAILING DIE.

Application filed January 12, 1923. Serial No. 612,254.

This invention relates to nailing dies and has for its object the improvement of such dies with a view to increasing their usefulness by making a single die capable of operating upon a wide variety of work and furthermore by making it easier to exchange one mechanism for another when such an operation is necessary.

In the accomplishment of the above-indicated object the invention provides a nailing die constructed and arranged to accommodate itself to work having different characteristics such, for example, as the requirement that nails be driven at certain locations which may be different in different individual pieces of work; and may also provide features of construction which will facilitate the interchange of certain elements which it may be desirable, under certain circumstances, to change.

One useful application of the invention is in a nailing die for heeling machines intended to be used in attaching rubber heels, and the illustrative embodiment of the invention which is hereinafter described in detail is such a heeling machine die. It should be understood, however, that the invention is adaptable to other operations than attaching rubber heels and that the specific construction herein disclosed is shown for illustrative purposes only.

In attaching rubber heels by machinery a great deal of difficulty has been experienced in causing the attaching nails to find unerringly, and pass properly through, the holes in the washers or supporting plates which are usually embedded in such heels. This difficulty, as is well understood by those skilled in the art, resulted principally from the fact that in individual heels, even those supposedly identical, the relation of the washers, or washer bearing portions of the heels was not exactly the same. The co-pending application of John B. Hadaway, Serial No. 596,887, filed Oct. 25, 1922 discloses a mechanism by which this difficulty has been successfully overcome, and the present invention may, in a certain sense, be regarded as an improvement upon and development of the invention disclosed in the said Hadaway application.

According to the present invention nail guiding tubes are mounted in a die block or other suitable support in a manner to permit free transverse movement of their nozzle ends in all directions and a locating member, controlling the nozzle ends of the tubes, is provided, the said locating member being constructed and arranged to permit free transverse movement of the nozzle ends of the tubes within restricted limits. By providing a plurality of interchangeable locating, or pattern, members differing from each other, it becomes possible, by merely replacing one locating member by another, to utilize the same nail guiding tubes for a variety of different nailings while yet permitting their nozzle ends to adjust themselves freely, within the restricted limits provided for by any given locating device, to lesser variations in the exact positions required by different individual pieces of work.

Further features and advantages of the invention will be understood and appreciated from reading the following detailed description of one good practical embodiment thereof in connection with the accompanying drawings, in which Figure 1 is a plan view of a heeling machine nailing die embodying the invention;

Figure 1:
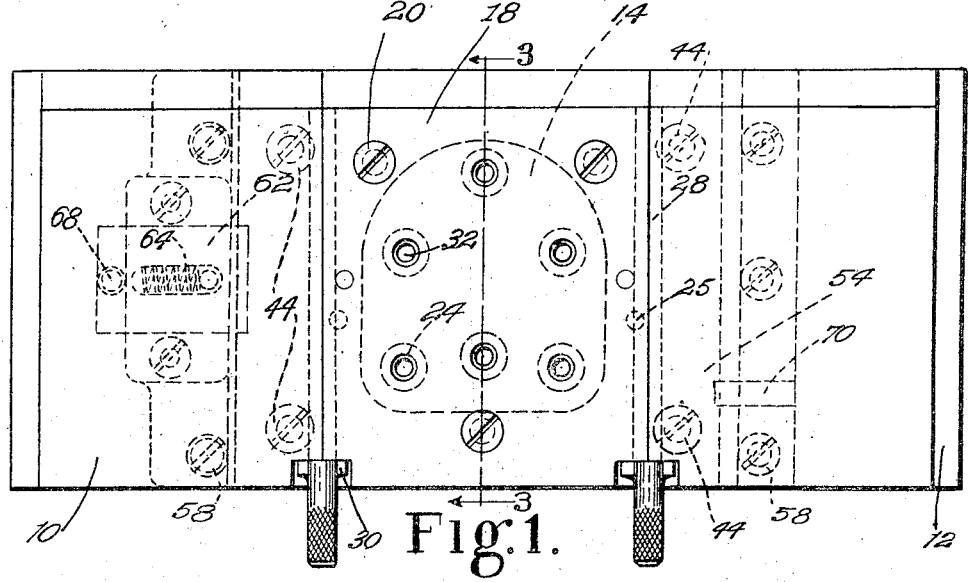

Referring now to the drawings, 10 indicates a die block having projecting tongues 12 at its sides and so constructed that it may be readily inserted in the guides provided for that purpose in a well-known type of commercial heeling machine such, for example, as that disclosed in my prior Patent, No. 1,431,980, dated October 17, 1922, to which reference may be had for a more complete disclosure of the heeling machine itself.

The die block 10 is chambered to provide an open space 14 extending entirely through it. The upper portion of the die block is further recessed to provide a mounting for two plates 16, 18 which are secured together by screws 20 and constitute a mounting for a plurality of nail guiding conduits or tubes 22. Each of the tubes 22 has its upper end formed as a section of a sphere, as shown at 24, and the plates 16, 18 have corresponding cavities formed in their adjacent faces to fit the spherical surfaces 24 and retain the nail guiding tubes in their proper relative positions. The spherical heads 24 of the tubes have a sufficiently loose fit in their seats to permit the lower, or nozzle, ends of the tubes to move freely in any horizontal direction, the mounting described constituting a universal joint. By locating the plane of separation between the plates 16, 18 in the diametrical plane of the spheres 24, the manufacture and assembly of the device are made simple, and the replacement of a broken or worn-out nail guiding tube is made easy.

The nail tube mounting, comprising the plates 16, 18, is accurately located in the die block by dowel pins 25, secured in the die block and arranged to enter holes 26 in the tube mounting. For the purpose of securing the tube mounting in its located position two round pins 28 are provided. Holes in which these pins fit are drilled, half in the die block 10 and half in the nail tube supporting unit, the pins acting as keys to prevent the tube supporting unit from being lifted off the dowel pins 25. The pins 28 are provided with semi-circular collars 30 which, after the holding pins 28 are inserted, are turned down into co-operating recesses to prevent the pins from being accidentally withdrawn.

The holes 32 in the plate 18, which are in register with the tubes 22, are slightly countersunk at the top to facilitate the entrance of the nail drivers 34 of the heeling machine. The upper ends of the holes through the nail guiding tubes are considerably more deeply countersunk, as shown at 36 to insure the entrance of the drivers 34 into the tubes, even though the latter be swung considerably out of a vertical position. The nozzle ends of the tubes 22 are tapered, as shown at 38, in order that the tubes shall enter and position themselves properly in the nail locating cavities in the tread face of a rubber heel in the manner fully set forth in the Hadaway application, hereinbefore referred to.

For the purpose of locating the nozzle ends of the tubes 22 in approximately the pattern of the desired nailing a pattern member or plate 40 is provided. A series of tapered holes 42, the centers of which are arranged in the pattern of the desired nailing, is formed in the plate 40. Each of the openings 42 is enough larger than the portion of the tube 22 located therein to permit the nozzle end of the tube to swing freely in all directions within restricted limits, while preventing the tube from getting so far away from its intended position that its nozzle end will not enter the cavity in the tread face of the heel. It will be understood that, by virtue of this construction, the nail guiding tubes 22 are maintained in such relative positions that they will enter with certainty the cavities in the heel and are, at the same time, free to adjust themselves exactly to the individual cavities regardless of any ordinary misplacement of the latter.

Secured to the under side of the pattern plate 40 by screws 44 is a ring or form 46 which fits exactly the particular size and shape of heel to be attached. The walls of the opening 48 in this ring may be beveled, as shown at 50, to facilitate the introduction of the heel 52, which fits sufficiently tightly in the ring to be retained therein by friction.

The tube locating and heel holding unit comprising the plate 40 and the ring 46, is supported at the under side of the die block 10 by means which will now be described.

Figure 2:
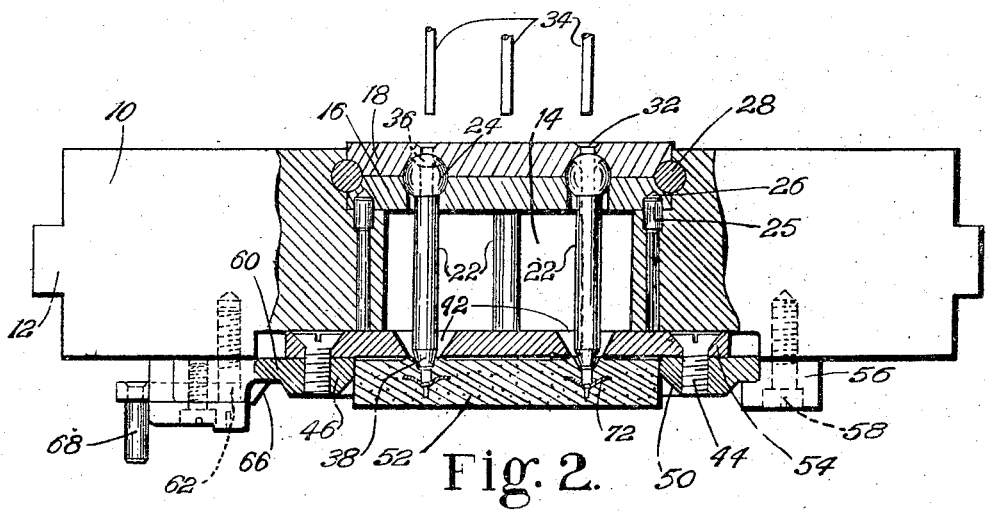
Fig. 2 is a front view, partly in section, of the die illustrated in Fig. 1.

One edge 54 of the ring 46 is formed to enter a guideway provided by a gib 56 secured to the lower side of the die block 10 by bolts 58. The opposite edge 60 of the ring cooperates with a sliding latch 62 mounted on the lower side of the die block. A spring 64 tends to move the latch 62 toward the right, as viewed in Fig. 2, and the end of the latch is beveled, as shown at 66. A handle 68 is provided for retracting the latch manually when desired.

Figure 5:
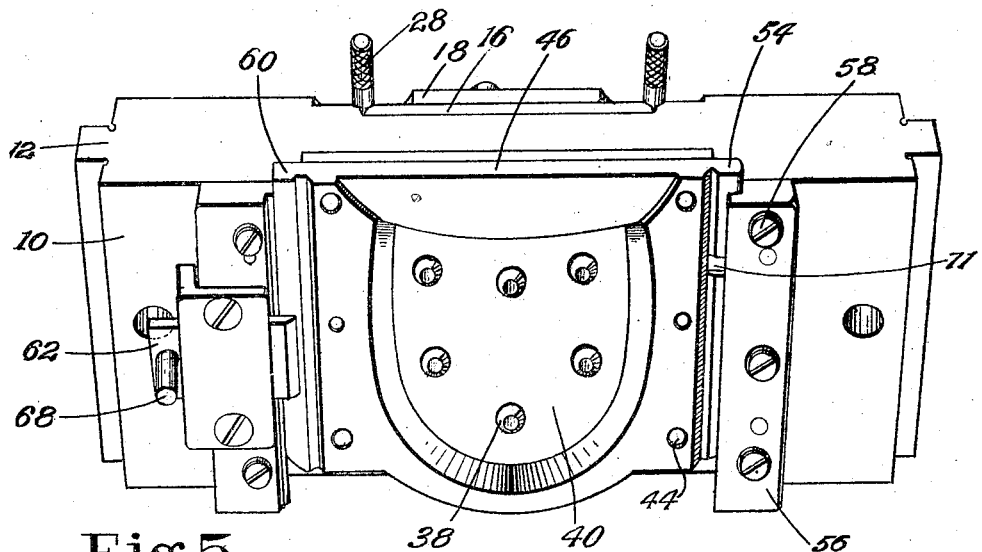
Fig. 5 is a perspective view of the assembled nailing die from a viewpoint below the die.
Figure 4:
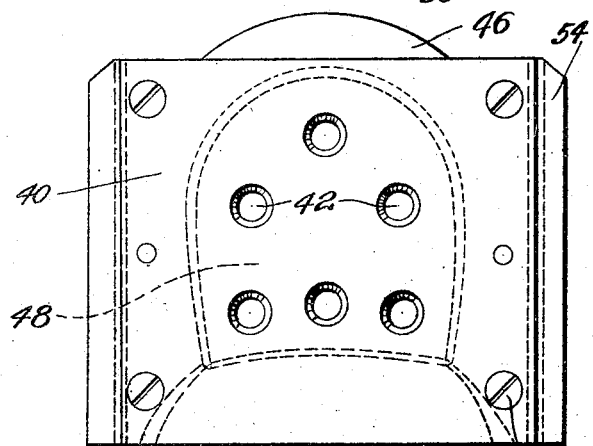
Fig. 4 is a plan view of one of the interchangeable pattern plates.

A horizontal pin 70, see Fig. 1, secured in the gib 56, is arranged to enter a corresponding notch 71 (see Fig. 5) in the edge 54 of the ring 46 to prevent forward or rearward movement of the ring and the attached pattern plate 40.

As many pattern plates and heel rings are provided as are necessary to accommodate the different sizes and shapes of heels to be attached and different nailings to be produced. These pattern plates and rings are all interchangeable and, as long as no change is made in the number of nails to be driven, no change in, nor adjustment of, the mechanism is required, inasmuch as it has been determined in actual practice that, with the parts properly proportioned, one set of nail guiding tubes can be used to cover a wide range of nailings. If, however, the difference between the largest and smallest sizes to be nailed is extreme, it is possible to exchange the nail tube supporting unit, and the tubes mounted therein, very quickly and without the use of any tools.

In the ordinary use of the heeling machine the changes which are required to be made frequently affect only the heel ring and the pattern plate and these, being secured together are handled as a unit. When it is desired to change from one to another the operator simply retracts the latch 62 by means of the handle 68, allowing the ring and pattern plate unit to drop into his hand. Another similar unit is then placed in position by virtually a single movement, the edge 54 being inserted beneath the gib 56 and the edge 60 being pushed upward past the beveled end 66 of the latch 62, the latch automatically snapping into retaining position as soon as the edge of the heel ring has passed it.

Figure 3:
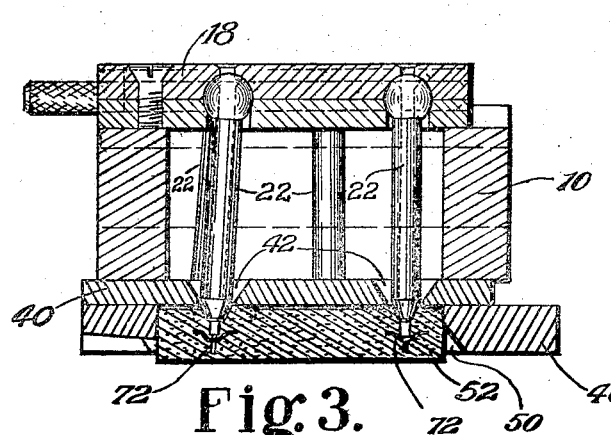
Fig. 3 is a sectional view on the line 3—3 of Fig. 1, showing the manner in which the nail guiding tubes accommodate themselves to the requirements of an individual piece of work.

Fig. 3 illustrates the position assumed by the tube 22 when a pattern plate 40 is used which is designed for a nailing differing considerably in size from the pattern formed by the holes 32 in the plate 18. The proportions of the parts are such, however, that, even when they are swung to extreme positions, they are deflected only a few degrees one side or the other of the vertical. The drivers 34 are sufficiently resilient to follow the deflected nail guiding tubes easily and the most extreme deflections are not sufficient to cause the nails to be inclined to an objectionable degree. This is especially true since the nails are guided by the tubes 22 substantially all the way to the holes in the washers 72 and, therefore, practically cannot fail to enter and pass through said holes.

Having described the invention, what is claimed as new and desired to be secured by Letters Patent is:—

1. A nailing die having a plurality of self adjusting nail guiding tubes supported to permit free transverse movement of their nozzle ends in all directions, and a work engaging pattern member arranged to engage said nozzle ends to control the pattern of the nailing.

2. A nailing die having a plurality of nail guiding tubes supported to permit free transverse movement of their nozzle ends in all directions, and means for detachably supporting, in proper position to engage and locate said nozzle ends, one of a plurality of different, interchangeable, work engaging pattern members to produce a selected one of a plurality of different nailing patterns.

3. In a nailing die, the combination of a self adjusting nail guiding tube, a die block in which the tube is mounted to permit free transverse movement of its nozzle end in all directions, and a locating member surrounding the nozzle end of the tube constructed and arranged to permit free transverse movement of said nozzle end within restricted limits.

4. In a nailing die, the combination of a die block having an opening therethrough, self adjusting nail guiding tubes suspended therein for universal transverse movement in all directions, and a pattern plate for the nozzle ends of the tubes having openings larger than the tubes but smaller than the opening in the die block.

5. In a nailing die, the combination, of a die block having an opening therethrough, nail guiding tubes suspended therein for universal transverse movement, in all directions, and means for detachably supporting across the die block opening, in proper position to engage and locate the nozzle ends of the tubes, one of a plurality of interchangeable pattern plates having openings smaller than the opening in the die block arranged in different patterns all within the limits defined by said die block opening.

6. A nailing die for heeling machines having, in combination, a plurality of movable nail guiding tubes, and means for detachably supporting, in proper position to engage the tubes, one of a plurality of different interchangeable locating devices each constructed and arranged to locate the tubes in approximately the positions which they should assume for one nailing.

7. A nailing die for heeling machines having, in combination, a plurality of movable nail guiding tubes, and means for detachably supporting, in proper position to engage the tubes, one of a plurality of different interchangeable locating devices, each constructed and arranged to hold the tubes loosely in approximately the positions which they should assume for a given nailing while permitting said tubes to move freely within restricted limits to adjust themselves to inaccuracies in the work.

8. A nailing die for heeling machines having, in combination, a plurality of relatively movable nail guides and means for detachably supporting, in co-operative relation to the nail guides, one of a plurality of different interchangeable units, each comprising a nail guide locating device and a heel locating device.

9. A nailing die for heeling machines having, in combination, a plurality of nail guiding tubes mounted to permit free movement of their nozzle ends, and means for detachably supporting, in proper position to engage the nozzle ends of the tubes, one of a plurality of different interchangeable units, each comprising a pattern member arranged to engage said noozle ends to control the pattern of the nailing, and a heel holder arranged to locate a heel in proper relation to the pattern of the nailing provided for by said pattern member.

10. In a nailing die for heeling machines, the combination of a die block, a readily removable supporting member having a series of nail guiding tubes mounted therein for free movement of their nozzle ends, and a readily removable pattern member spaced from and independent of the tube supporting member, arranged to engage said nozzle ends to control the pattern of the nailing.

In testimony whereof I have signed my name to this specification.

JOSEPH H. POPE.